United States Patent
Bulle

(10) Patent No.: US 6,218,639 B1
(45) Date of Patent: Apr. 17, 2001

(54) PLASMA TORCH CUTTING SYSTEM

(76) Inventor: Jason Bulle, 7537 E. Garfield St., Scottsdale, AZ (US) 85257

( * ) Notice: Subject to any disclaimer, the term of this patent is extended or adjusted under 35 U.S.C. 154(b) by 0 days.

(21) Appl. No.: 09/477,514

(22) Filed: Jan. 4, 2000

Related U.S. Application Data

(60) Provisional application No. 60/164,512, filed on Nov. 10, 1999.

(51) Int. Cl.⁷ ..................................................... B23K 10/00
(52) U.S. Cl. .............................. 219/121.39; 219/121.48; 219/121.36; 266/62
(58) Field of Search ........................ 219/121.39, 121.44, 219/121.45, 121.46, 121.54, 75, 121.57, 121.36; 266/57, 59, 61, 76, 62

(56) References Cited

U.S. PATENT DOCUMENTS

| | | | |
|---|---|---|---|
| 4,010,346 | * 3/1977 | Cecil et al. | 219/121 PL |
| 4,349,182 | * 9/1982 | Blackburn | 266/59 |
| 4,540,869 | * 9/1985 | Yasuoka | 219/121.36 |
| 5,091,625 | * 2/1992 | Kohda et al. | 219/121.44 |
| 5,550,344 | * 8/1996 | Winterfeldt | 219/121.39 |
| 6,051,803 | * 4/2000 | Hale, Jr. | 219/121.39 |

* cited by examiner

*Primary Examiner*—Mark Paschall
(74) *Attorney, Agent, or Firm*—Parsons & Goltry; Robert A. Parsons; Michael W. Goltry

(57) ABSTRACT

A cutting system including a gantry mounted to a platform, reciprocally movable above a support surface horizontally along a y axis. A carriage is mounted to the gantry for reciprocal movement thereon along an x axis, generally perpendicular to the y axis. A support is carried by the carriage and movable between a lowered position and a raised position. A holder is pivotally coupled to the support and movable between a first position and a second position relative the support. A sensor mechanism detects the holder in the second position and actuates the drive mechanism to move the support until the holder returns to the first position, and an attachment assembly is carried by the holder for removably attaching a cutting device to the holder.

15 Claims, 5 Drawing Sheets

PLASMA TORCH CUTTING SYSTEM

This application claims the benefit of U.S. Provisional Application Ser. No. 60/164,512 filed Nov. 10, 1999.

FIELD OF THE INVENTION

This invention relates to systems for cutting material and, more particularly, to a system using a plasma torch for cutting shapes out of metal sheets and plates.

BACKGROUND OF THE INVENTION

Plasma torches have been used for many years for cutting shapes from sheets of metal materials. Handheld plasma torches have been developed for quickly and efficiently cutting shapes from materials. While efficient in cutting material, handheld torches are limited in their accuracy to the skill of the operator. Some parts, such as those for artistic works may not need to be accurate. Other parts, such as those used in mechanical devices, often need to meet certain tolerances and need extreme accuracy. Extreme accuracy is not possible with a manually operated handheld plasma torch.

To overcome this problem, plasma torches have been developed which are designed specifically to be mounted to machines capable of controlling the torches horizontally along an x axis and a y axis. These machines can be programmed to cut shapes by inputting a system of coordinates. They can be highly accurate and produce identical parts. There are, however, a number of problems with these devices. Operation of the systems is very complex, requiring extensive training, programming of the device can be very time consuming, and small changes require reworking of the entire program. The systems are expensive and the torches themselves are more costly than the handheld torches. These problems reduce the economic gains achieved by having an automated system performing the cuts.

Other problems include accuracy and efficiency. While cutting a planar sheet of material would appear to require only movement of the torch horizontally along an x axis and a y axis, the sheets being cut may not be absolutely planar, or more likely, upon cutting, the heat generated can cause buckling of the material. As the cutting torch moves over the surface of the material, these irregularities can result in changes in the distance between the tip of the torch and the surface being cut. The changes in distance can adversely effect the accuracy of the cut. Furthermore, pressure on the tip can cause damage thereto or result in a stoppage. All of these problems can be costly in time, accuracy and money.

In conventional plasma cutting machines using computer numeric control (CNC) programming multiple time consuming creation and conversion steps are required. For example, in cutting geometric parts, the operator must draw up a design using a CAD program, or import an existing design from another CAD program. Still using the expensive CAD program, the operator must manually add pierce points and other features to the design to ready it for cutting. This step alone can take hours. Then the operator must export the drawing as a vector file from the CAD program and import the vector file into a program which is able to sort the entities and build a machine code program file. The machine code program file is then loaded into a text editing program and manually edited to cut multiple copies of parts, control kerf compensation, etc. The machine code program file is then loaded into a program that is able to transfer it by serial port to the plasma cutting machine. The machine can now run the program that it has stored in memory. Each of these steps is extremely time consuming and requires costly equipment.

Accordingly, it would be highly desirable to provide a new and improved cutting system.

It is a purpose of the invention to provide a new and improved cutting system for controlling a handheld plasma torch.

It is another purpose of the invention to provide a new and improved cutting system which is quicker and easier to use and controlled directly by a computer on which the image is generated.

It is still another purpose of the invention to provide a new and improved cutting system which moves along a z axis as well as an x axis and a y axis.

It is a further provision of the invention to provide a new and improved cutting system which can follow the contours of a sheet of material being cut.

It is still a further provision of the invention to provide a cutting system operable directly from the output of a computer generated shape.

SUMMARY OF THE INVENTION

Briefly, to achieve the desired objects of the present invention in accordance with a preferred embodiment thereof, S provided is a cutting system including a platform having a generally horizontal support surface. A gantry is mounted to the platform and reciprocally movable above the support surface horizontally along a y axis. A carriage is mounted to the gantry for reciprocal movement thereon along an x axis, generally perpendicular to the y axis. A support is carried by the carriage and movable between a lowered position and a raised position by a drive mechanism. A holder is pivotally coupled to the support and movable between a first position and a second position relative the support. A sensor mechanism which detects the holder in the second position and actuates the drive mechanism to move the support until the holder returns to the first position, and an attachment assembly is carried by the holder for removably attaching a cutting device to the holder.

BRIEF DESCRIPTION OF THE DRAWINGS

The foregoing and further and more specific objects and advantages of the invention will become readily apparent to those skilled in the art from the following detailed description taken in conjunction with the drawings in which.

DETAILED DESCRIPTION OF A PREFERRED EMBODIMENT

Figure 1:
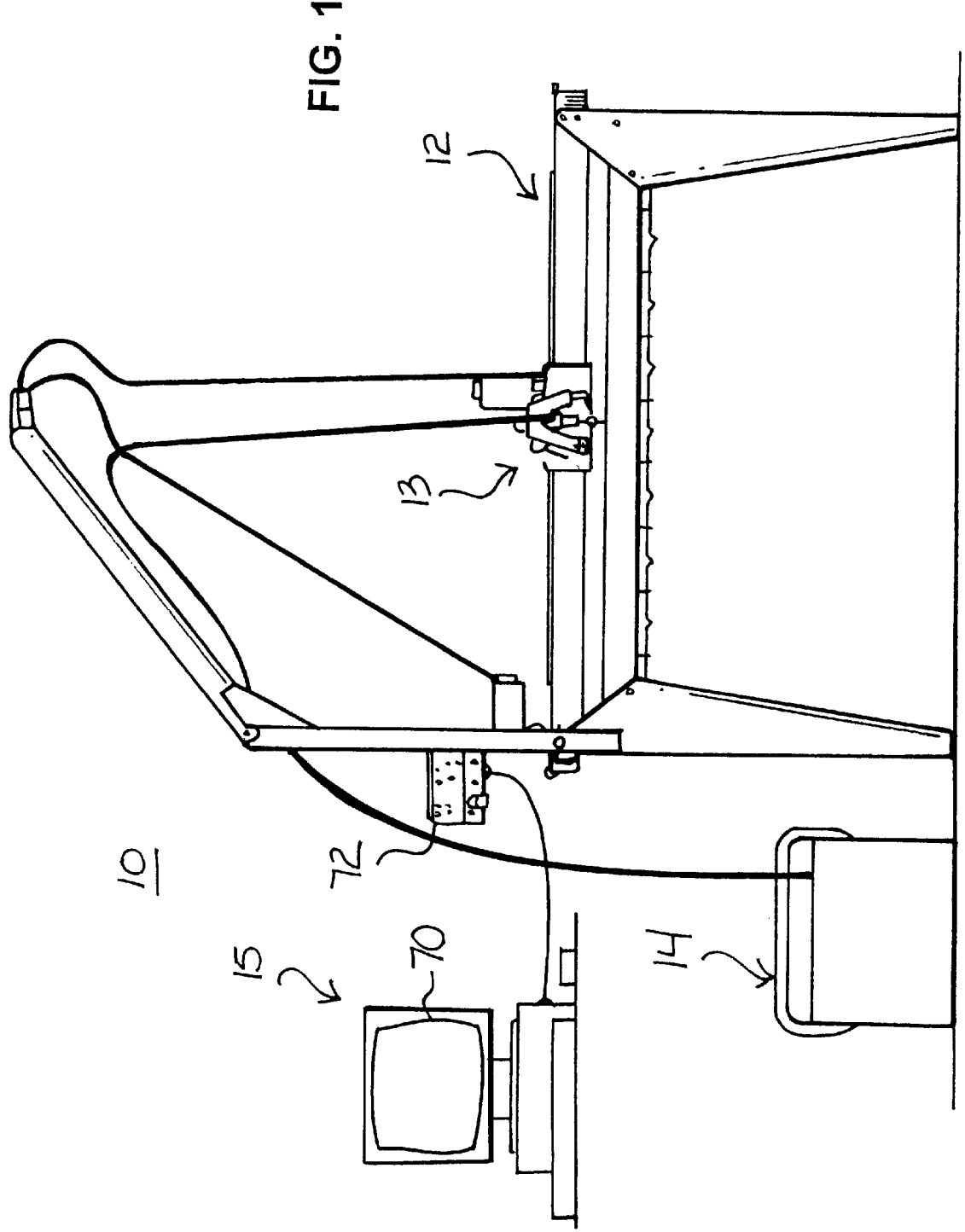
FIG. 1 is a side view of the cutting system according to the present invention.

Turning to the drawings, in which like reference characters indicate corresponding elements throughout the several views, attention is first directed to FIG. 1 which illustrates a cutting system generally designated 10. Cutting system 10 is designed to quickly, easily and economically cut shapes from sheets of rigid materials such as metals. Cutting system 10 includes a platform 12, cutter moving assembly 13, a cutting device 14, and a control system 15.

Figure 2:
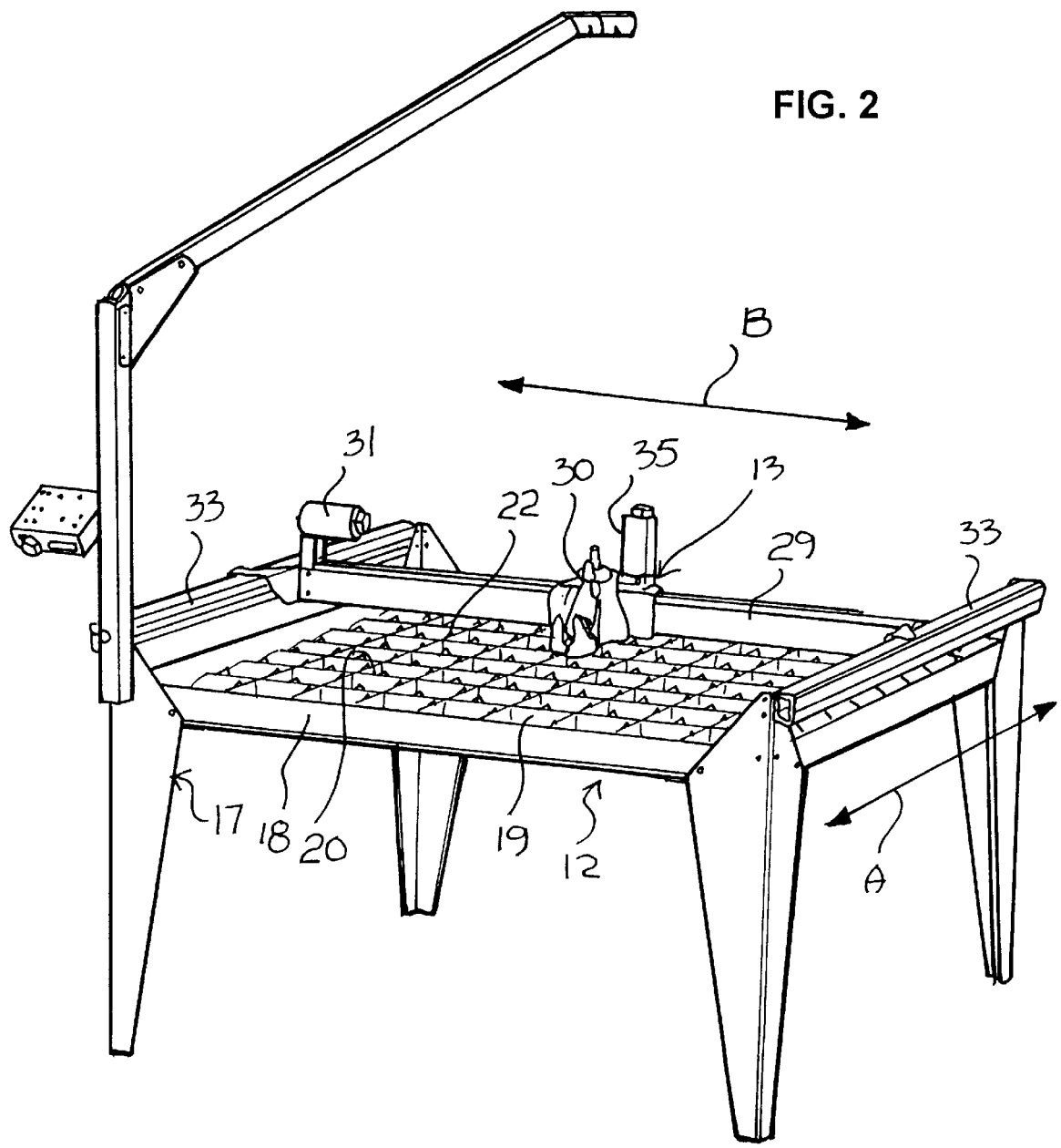
FIG. 2 is a perspective view of the cutting platform of the present invention.

With additional reference to FIG. 2, platform 12 includes a cutting table 17 having a generally horizontal support surface 18. Support surface 18 is preferably composed of a plurality of slats 19 forming a grate 20. Each slat 19 includes a plurality of upwardly directed grate points 22. The plurality of grate points 22 form points upon which a work piece rests. Points 22 reduce the area of contact between support surface 18 and the work piece so that cut paths can be formed which will not damage support surface 18.

Still referring to FIG. 2, cutter moving assembly 13 includes a gantry 29, and a carriage 30. Gantry 29 extends between opposing edges of cutting table 17 and is reciprocally moved horizontally over cutting surface 18 by a drive mechanism 31. Drive mechanism 31 drives both ends of gantry 29 through gears at each end driven by a shaft. A pair of tracks 33 are mounted on the opposing edges of cutting table 17, supporting and guiding gantry 29. Gantry 29 is reciprocally movable along a y axis as indicated by double arrow A. Carriage 30 is mounted on gantry 29 for reciprocal movement therealong. Carriage 30 is moved along an x axis by a drive mechanism 35. The x axis is designated by double arrow B, and is substantially perpendicular to the y axis. The cooperation of gantry 29 and carriage 30 allow carriage 30 to be moved to any point on support surface 18 following substantially any path desired. In this manner, substantially any shape can be cut from a work piece.

Figure 3:
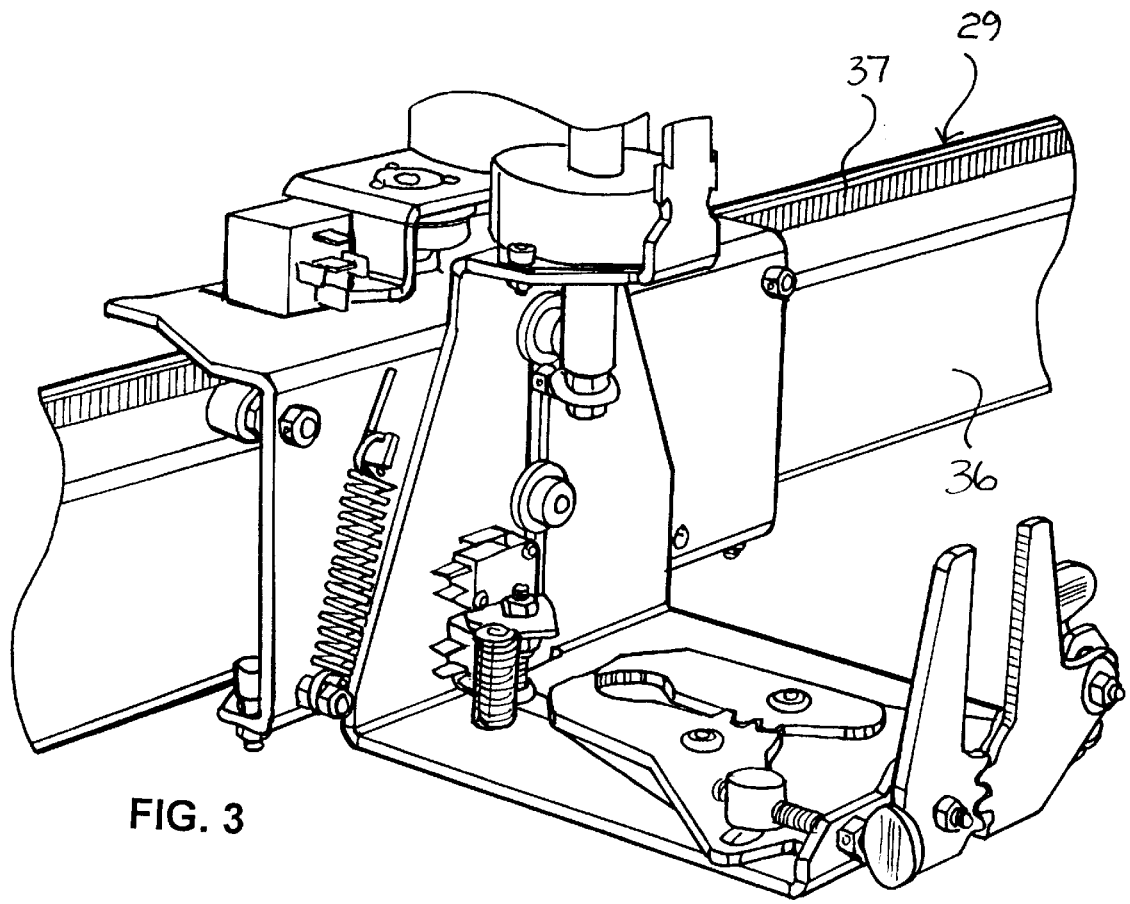
FIG. 3 is an enlarged partial perspective view illustrating the carrier mounted on the gantry of the cutting platform of FIG. 2.
Figure 4:
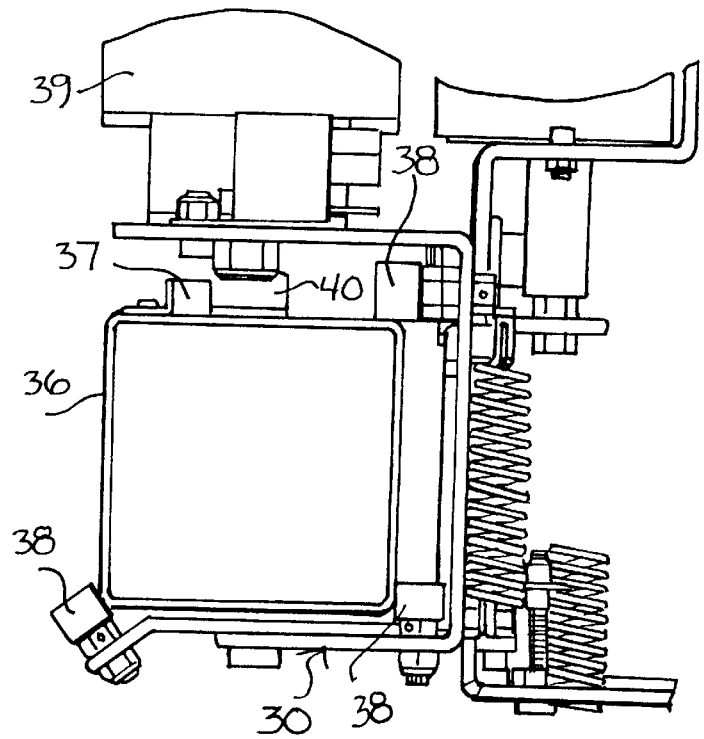
FIG. 4 is a side view of the carrier as it would appear mounted to the gantry.

Turning now to FIGS. 3 and 4, the mounting of carriage 30 on gantry 29 is illustrated. Gantry 29 further includes a tube 36 having a track 37 extending from the top surface thereof. Carriage 30 includes a plurality of rollers 38 configured to engage tube 36 and securely retain carriage 30 thereto. Drive mechanism 35 includes a reversible electric motor 39 carried by carriage 30 which rotates a drive wheel 40. Drive wheel 40 engages track 37 and propels carriage 30 along tube 36. In a preferred embodiment, track 37 and wheel 40 can be what is conventionally known as a rack and pinion system.

Figure 5:
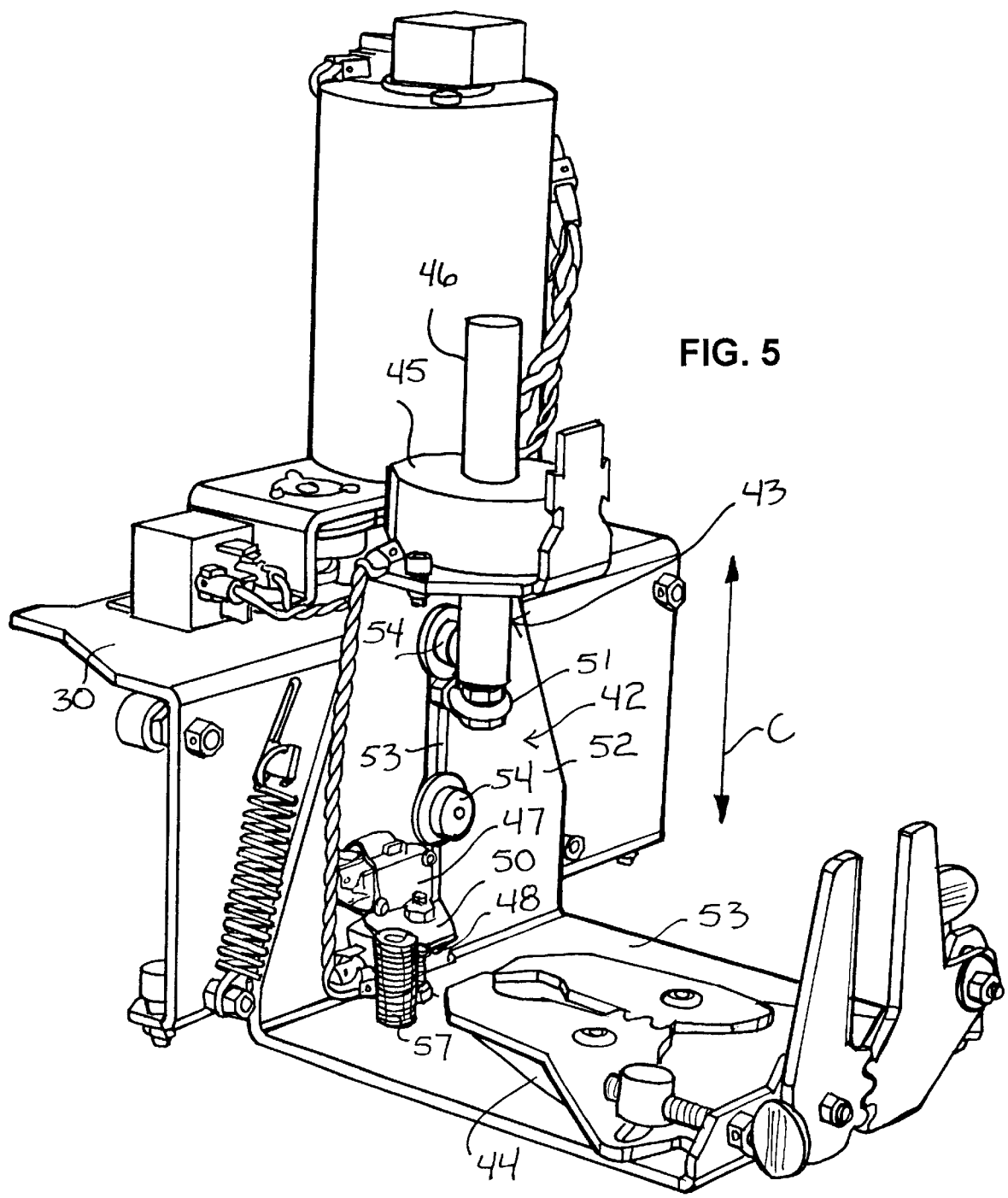
FIG. 5 is a perspective view of the carrier of the cutting platform illustrated in FIGS. 3 and 4.

Referring now to FIG. 5, cutter moving assembly 13 further includes a support 42 carried by carriage 30 and reciprocally movable between a lowered position and a raised position by a drive mechanism 43 along a z axis designated by double arrow C. It should be understood that support 42 can be positioned between the raised and lowered positions during operation. Drive mechanism 43 is preferably a nut and screw arrangement allowing for very precise movement. In this specific embodiment, a nut 45 (which is a motor and nut arrangement) is fixedly attached to support 42 and a vertical screw 46 is threadedly engaged through nut 45 and fixedly attached to carriage 30 by means of a horizontal anchor 51. Anchor 51 extends through a vertical slot 53 in support 42 and fixedly attaches screw 46 to support 42. A pair of sliding guides 54 extend through slot 53 and are engaged in carriage 30 to provide for easy vertical sliding movements and to stabilize support 42. While sliding guides 54 are employed in the present embodiment, one skilled in the art will understand that other mechanisms can be employed. For example, the movement of support 42 along z axis C can be guided by rollers.

A holder 44 is pivotally coupled to support 42 and movable between a first position, a second position, and a third position relative support 42 as indicated by curved arrow D. In this embodiment, holder 44 is a cutout portion of support 42 and is joined to support 42 at a distal edge. Because the motion is very small, it can be achieved through a simple flexing motion of holder 44. A sensor mechanism carried by support 42 detects holder 44 in the second position and the third position and actuates drive mechanism 43 to move support 42 in the required direction until holder 44 returns to the first position. For example, if the second position is defined as holder 44 being inclined with respect to support 42, support 42 is raised towards the raised position by drive 43 until holder 44 reaches the first position relative support 42. If the third position is defined as holder 44 being declined with respect to support 42, support 42 is lowered toward the lowered position by drive 43 until holder 44 reaches the first position relative support 42.

The sensor mechanism includes a first switch 47 and a second switch 48 mounted to support 42 in a spaced apart relationship. A holder stop 50 is carried by holder 44 and positioned to activate first switch 47 with holder 44 in the second position, and activate second switch 48 with holder 44 in the third position. Neither first switch 47 nor second switch 48 is activated with holder 44 in the first position. It should be understood that the pivotal movement of holder 44 is very slight, with for example, the entire range of motion being only 0.12 inches.

Still referring to FIG. 5, support 42 includes an upright portion 52 carrying first switch 47 and second switch 48 and a substantially horizontal portion 53 extending from a lower edge thereof. Holder 44 is pivotally coupled to substantially horizontal portion 53 with an upstanding member 55 carrying holder stop 50 adjacent upright portion 52 between first switch 47 and second switch 48. A tension spring 57 extends from portion 53 and adjustably engages stop 50, biasing it towards portion 53 and second switch 48. This maintains a slight pressure between the tip of nozzle 65 and the surface of the material being cut.

Figure 6:
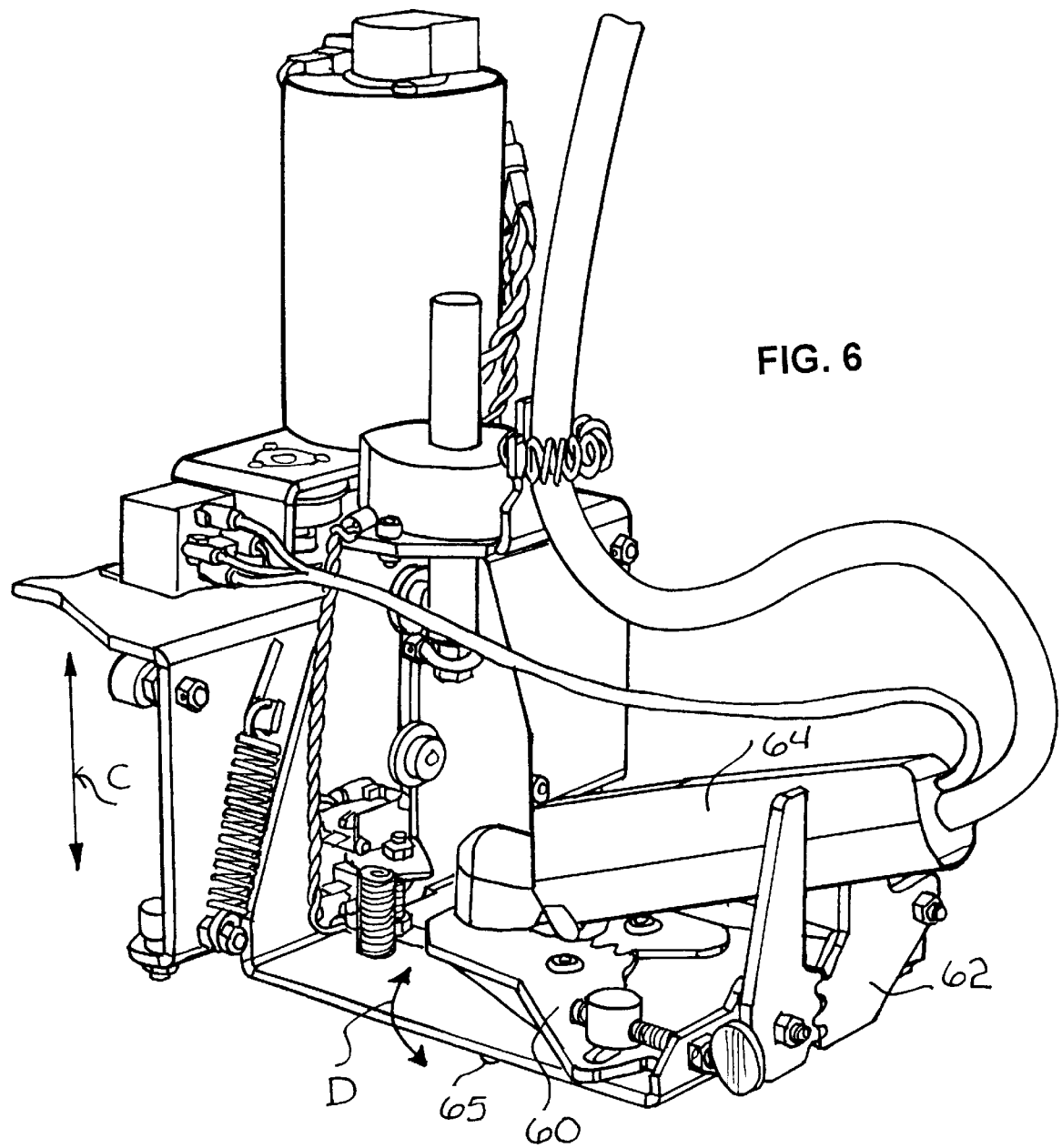
FIG. 6 is a perspective view of the carrier of FIG. 5 carrying a handheld plasma torch.

Still referring to FIG. 5, with additional reference to FIG. 6, an attachment assembly including a substantially horizontal gripping member 60 and an upright gripping member 62 is carried by holder 44 for gripping and cutting device 14. In the preferred embodiment, cutting device 14 is a handheld plasma torch 64. A nozzle 65 of torch 64 is positioned to be substantially perpendicular to support 42 with holder 44 in the first position.

Referring back to FIG. 1, control system 15 includes a computer 70 containing software for importation, alteration or creation of a design using a CAD program. The design or shape is made up of a plurality of vectors which computer 70 translates into a set of digital coordinates and movement directions. These directions are output to a control box 72 which converts them into driver impulses for controlling the drive mechanisms of cutter moving assembly 13. The computer directly controls the operation of the cutter. A user simply creates, imports or changes a design and directs the computer to begin cutting. In operation, computer 70 includes a program, such as a CAD program that translates a plurality of vectors defining a work to be cut into movement commands. Drivers in control box 72 are coupled to the computer to receive the movement commands and control gantry movement and carriage movement. The computer can further include a program for importing, altering, and/or creating designs having a plurality of vectors. Gantry movement and carriage movement is achieved by electric motors mechanically coupled to the gantry and carriage and electrically coupled to the drivers.

The invention has been described above with reference to one or more preferred embodiments. However, those skilled in the art will recognize that changes and modifications may be made in the described embodiments without departing from the nature and scope of the invention. Various changes and modifications to one or more of the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A cutting system comprising:
   a carriage reciprocally movable along an x axis;
   a support carried by the carriage and movable between a lowered position and a raised position by a drive mechanism;
   a holder pivotally coupled to the support for movement between a first position and a second position relative to the support;
   a sensor mechanism which detects the holder in the second position and actuates the drive mechanism to move the support until the holder returns to the first position;
   the holder further includes being movable to a third position, and the sensor mechanism being capable of detecting the holder in the third position and actuating the drive mechanism to move the support until the holder returns to the first position; and
   an attachment assembly carried by the holder for removably attaching a cutting device to the holder.

2. A cutting system as claimed in claim 1 wherein the sensor mechanism includes a first switch and a second switch mounted to the support in a spaced apart relationship, and a holder stop carried by the holder and positioned to activate the first switch with the holder in the second position, the second switch with the holder in the third position, and neither the first switch nor the second switch with the holder in the first position.

3. A cutting system as claimed in claim 2 wherein the support includes an upright portion carrying the first switch and the second switch and a substantially horizontal portion extending from a lower edge of the upright portion, the holder pivotally coupled to the substantially horizontal portion with an upstanding member carrying the holder stop adjacent the upright portion between the first switch and the second switch.

4. A cutting system comprising:
   a carriage reciprocally movable along an x axis;
   a support carried by the carriage and movable between a lowered position and a raised position by a drive mechanism;
   a holder pivotally coupled to the support for movement between a first position and a second position relative to the support;
   a sensor mechanism which detects the holder in the second position and actuates the drive mechanism to move the support until the holder returns to the first position; and
   an attachment assembly carried by the holder for removably attaching a cutting device to the holder, the attachment assembly includes a substantially horizontal gripping member carried by the holder and an upright gripping member carried by the holder for gripping and retaining a plasma torch with a nozzle of the torch substantially perpendicular to the support with the holder in the first position.

5. A cutting system as claimed in claim 4 wherein the substantially horizontal gripping member and the upright gripping member are adjustable for gripping plasma torches of different sizes and shapes.

6. A cutting system as claimed in claim 4 wherein the plasma torch is a handheld plasma torch.

7. A cutting system comprising:
   a platform having a generally horizontal support surface;
   a gantry mounted to the platform and reciprocally movable above the support surface horizontally along a y axis;
   a carriage mounted to the gantry for reciprocal movement thereon along an x axis generally perpendicular to the y axis;
   a support carried by the carriage and movable between a lowered position and a raised position by a drive mechanism;
   a holder pivotally coupled to the support and movable between a first position and a second position relative the support;
   a sensor mechanism which detects the holder in the second position and actuates the drive mechanism to move the support until the holder returns to the first position;
   the holder further includes being movable to a third position, and the sensor mechanism being capable of detecting the holder in the third position and actuating the drive mechanism to move the support until the holder returns to the first position; and
   an attachment assembly carried by the holder for removably attaching a cutting device to the holder.

8. A cutting system as claimed in claim 7 wherein the support surface includes a plurality of upwardly directed points forming a grid.

9. A cutting system as claimed in claim 7 wherein the sensor mechanism includes a first switch and a second switch mounted to the support in a spaced apart relationship, and a holder stop carried by the holder and positioned to activate the first switch with the holder in the second position, the second switch with the holder in the third position, and neither the first switch nor the second switch with the holder in the first position.

10. A cutting system as claimed in claim 9 wherein the support includes an upright portion carrying the first switch and the second switch and a substantially horizontal portion extending from a lower edge of the upright portion, the holder pivotally coupled to the substantially horizontal portion with an upstanding member carrying the holder stop adjacent the upright portion between the first switch and the second switch.

11. A cutting system comprising:
    a platform having a generally horizontal support surface;
    a gantry mounted to the platform and reciprocally movable above the support surface horizontally along a y axis;
    a carriage mounted to the gantry for reciprocal movement thereon along an x axis generally perpendicular to the y axis;
    a support carried by the carriage and movable between a lowered position and a raised position by a drive mechanism;
    a holder pivotally coupled to the support and movable between a first position and a second position relative the support;

a sensor mechanism which detects the holder in the second position and actuates the drive mechanism to move the support until the holder returns to the first position;

an attachment assembly carried by the holder for removably attaching a cutting device to the holder; and a control system including a computer having a program that translates a plurality of vectors defining a work to be cut into movement commands, drivers coupled to the computer to receive the movement commands and control gantry movement and carriage movement, and a program for one of importing, altering, and creating designs having the plurality of vectors.

12. A cutting system as claimed in claim 11 wherein the substantially horizontal gripping member and the upright gripping member are adjustable for gripping plasma torches of different sizes and shapes.

13. A cutting system as claimed in claim 11 wherein the plasma torch is a handheld plasma torch.

14. A cutting system comprising:

a platform having a generally horizontal support surface;

a gantry mounted to the platform and reciprocally movable above the support surface horizontally along a y axis;

a carriage mounted to the gantry for reciprocal movement thereon along an x axis generally perpendicular to the y axis;

a support carried by the carriage and movable between a lowered position and a raised position by a drive mechanism;

a holder pivotally coupled to the support and movable between a first position and a second position relative the support;

a sensor mechanism which detects the holder in the second position and actuates the drive mechanism to move the support until the holder returns to the first position;

an attachment assembly carried by the holder for removably attaching a cutting device to the holder; and a control system including a computer having a program that translates a plurality of vectors defining a work to be cut into movement commands, drivers coupled to the computer to receive the movement commands and control gantry movement and carriage movement, and a program for one of importing, altering, and creating designs having the plurality of vectors.

15. A cutting system comprising:

a platform having a generally horizontal support surface;

a gantry mounted to the platform and reciprocally movable above the support surface horizontally along a y axis;

a carriage mounted to the gantry for reciprocal movement thereon along an x axis generally perpendicular to the y axis;

a support carried by the carriage and movable between a lowered position and a raised position by a drive mechanism;

a holder pivotally coupled to the support and movable between a first position and a second position relative the support;

a sensor mechanism which detects the holder in the second position and actuates the drive mechanism to move the support until the holder returns to the first position;

an attachment assembly carried by the holder for removably attaching a cutting device to the holder; and a control system including a computer having a program that translates a plurality of vectors defining a work to be cut into movement commands, drivers coupled to the computer to receive the movement commands and control gantry movement and carriage movement by electric motors mechanically coupled to the gantry and carriage and electrically coupled to the drivers.

* * * * *